United States Patent
Palfai et al.

(10) Patent No.: US 12,044,297 B2
(45) Date of Patent: Jul. 23, 2024

(54) ROTATION DIRECTION DRIVEN TWO-SPEED TRANSMISSION

(71) Applicant: Atieva, Inc., Newark, CA (US)

(72) Inventors: Balazs Palfai, Newark, CA (US); Bela Hegedus, Emeryville, CA (US); Sai Enabothula, Milpitas, CA (US); Aravind Srinivasan, Fremont, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 18/456,405

(22) Filed: Aug. 25, 2023

(65) Prior Publication Data

US 2024/0068545 A1 Feb. 29, 2024

Related U.S. Application Data

(60) Provisional application No. 63/373,571, filed on Aug. 26, 2022.

(51) Int. Cl.
*F16H 3/66* (2006.01)
*F16H 48/06* (2006.01)

(52) U.S. Cl.
CPC ............ *F16H 3/66* (2013.01); *F16H 48/06* (2013.01); *F16H 2200/2007* (2013.01)

(58) Field of Classification Search
CPC ... F16H 3/66; F16H 3/44; F16H 48/06; F16H 2200/2007; F16H 2200/2084; F16H 2200/2087

See application file for complete search history.

(56) References Cited

U.S. PATENT DOCUMENTS

| | | | | |
|---|---|---|---|---|
| 4,653,348 A | * | 3/1987 | Hiraiwa | F16H 3/66 475/276 |
| 5,879,263 A | * | 3/1999 | Haka | F16H 3/66 475/276 |
| 6,022,288 A | * | 2/2000 | Cho | F16H 3/66 475/276 |
| 8,226,517 B2 | | 7/2012 | Tsai et al. | |

(Continued)

FOREIGN PATENT DOCUMENTS

| DE | 102007020345 A1 | 11/2008 |
|---|---|---|
| EP | 2361826 A1 | 8/2011 |

(Continued)

OTHER PUBLICATIONS

International Search Report and Written Opinion for PCT Application No. PCT/US2023/072956, mailed on Jan. 29, 2024, 19 pages.

(Continued)

*Primary Examiner* — Edwin A Young
(74) *Attorney, Agent, or Firm* — Brake Hughes Bellermann LLP (57) ABSTRACT

An electric motor comprises: a stator; a rotor having a rotor shaft; and a transmission coupled to the rotor shaft, wherein when the rotor shaft rotates in a first direction an output shaft of the transmission rotates in a second direction opposite to the first direction with a first gear ratio, and wherein when the rotor shaft rotates in the second direction the output shaft of the transmission rotates in the second direction with a second gear ratio different from the first gear ratio.

18 Claims, 9 Drawing Sheets

(56) References Cited

U.S. PATENT DOCUMENTS

| | | |
|---|---|---|
| 9,109,666 B1 | 8/2015 | Gauthier |
| 10,797,562 B2 | 10/2020 | Dlala et al. |
| 2002/0103049 A1* | 8/2002 | Takatori ................ F16H 61/061 |
| | | 475/70 |
| 2014/0235394 A1* | 8/2014 | Smetana .............. B60W 10/115 |
| | | 475/151 |
| 2015/0158382 A1 | 6/2015 | Mordukhovich et al. |
| 2017/0175868 A1 | 6/2017 | Riera et al. |
| 2023/0106800 A1 | 4/2023 | Hand et al. |

FOREIGN PATENT DOCUMENTS

| | | |
|---|---|---|
| KR | 20120099684 A | 9/2012 |
| WO | 2011060362 A1 | 5/2011 |

OTHER PUBLICATIONS

Invitation to Pay Additional Fees for PCT Application No. PCT/US2023/072956, mailed on Dec. 6, 2023, 14 pages.

* cited by examiner

ROTATION DIRECTION DRIVEN TWO-SPEED TRANSMISSION

CROSS-REFERENCE TO RELATED APPLICATION

This application claims benefit, under 35 U.S.C. § 119, of U.S. Provisional Patent Application No. 63/373,571, filed on Aug. 26, 2022, entitled "ROTATION DIRECTION DRIVEN TWO-SPEED TRANSMISSION", the disclosure of which is incorporated by reference herein in its entirety.

TECHNICAL FIELD

This document relates to a rotation direction driven two-speed transmission.

BACKGROUND

In some present electric vehicles, an electric motor may be designed to operate without a gearbox. As a result, such a motor operates with a fixed gear ratio at all times, which limits its performance and efficiency. Other present electric vehicles use a gearbox that allows shifting between two gears. However, these gearboxes are complex mechanisms that are costly to manufacture; they have inefficiencies, such as excessive drag; and they place a significant inertia load on the drivetrain (e.g., an excessive jerk when shifting).

SUMMARY

In a first aspect, a transmission comprises: a first sun gear; a first planetary gear having an axis fixed to a first ground in the transmission, the first planetary gear being gear coupled to the first sun gear; a first ring gear that is gear coupled to the first planetary gear; a first carrier member that carries the first ring gear; a second sun gear; a first one-way clutch coupled between the first carrier member and the second sun gear; a second one-way clutch coupled between the first sun gear and the second sun gear, the second one-way clutch having an opposite orientation than the first one-way clutch; a second planetary gear being gear coupled to the second sun gear; a second ring gear that is gear coupled to the second planetary gear; a third one-way clutch coupled between the second ring gear and a second ground in the transmission, the third one-way clutch having a common orientation with the first one-way clutch; and a second carrier member that carries the second ring gear.

Implementations can include any or all of the following features. The transmission further comprises an output shaft on the second carrier member. The first sun gear is aligned with the first planetary gear. The second sun gear is aligned with the first planetary gear. The first and second carrier members are aligned with each other.

In a second aspect, an electric motor comprises: a stator; a rotor having a rotor shaft; and a transmission comprising: a first sun gear; a first planetary gear having an axis fixed to a first ground in the electric motor, the first planetary gear being gear coupled to the first sun gear; a first ring gear that is gear coupled to the first planetary gear; a first carrier member that carries the first ring gear; a second sun gear; a first one-way clutch coupled between the first carrier member and the second sun gear; a second one-way clutch coupled between the first sun gear and the second sun gear, the second one-way clutch having an opposite orientation than the first one-way clutch; a second planetary gear being gear coupled to the second sun gear; a second ring gear that is gear coupled to the second planetary gear; a third one-way clutch coupled between the second ring gear and a second ground in the electric motor, the third one-way clutch having a common orientation with the first one-way clutch; and a second carrier member that carries the second ring gear.

Implementations can include any or all of the following features. The electric motor further comprises an output shaft on the second carrier member. The first sun gear is aligned with the rotor shaft. The second sun gear is aligned with the rotor shaft. The first and second carrier members are aligned with each other.

In a third aspect, a vehicle comprises: a first electric motor that provides passive reverse, wherein the first electric motor has a first rotation direction driven two-speed transmission; and a second electric motor.

Implementations can include any or all of the following features. The second electric motor is a single speed electric motor. The vehicle further comprises a transmission for the second electric motor. The first electric motor further has a second rotation direction driven two-speed transmission. The first electric motor is a rear motor in the vehicle, and wherein the second electric motor is a front motor in the vehicle. The second electric motor is a rear motor in the vehicle, and wherein the first electric motor is a front motor in the vehicle.

In a fourth aspect, a transmission comprises: a first sun gear; a first carrier member; a first planetary gear having an axis fixed to the first carrier member; a first ring gear that is gear coupled to the first planetary gear; a second carrier member that carries the first ring gear; a second sun gear coupled to the second carrier member; a first one-way clutch coupled between the first sun gear and the second sun gear; an intermediary gear that is co-axial with the first sun gear; a coupler movable between at least i) a first position where the coupler connects the first carrier member and the intermediary gear to each other, and ii) a second position where the coupler instead connects two components of the transmission to each other to facilitate operation in reverse gear and regenerative braking; and a second one-way clutch coupled between the intermediary gear and ground in the transmission.

Implementations can include any or all of the following features. The transmission further comprises a solenoid configured to actuate the coupler into the first or second position. The first position corresponds to the transmission operating in any of a first gear or a second gear. In the first gear the second one-way clutch is engaged and prevents rotation of the intermediary gear. In the second gear the second one-way clutch is not engaged. While the transmission is operating in the reverse gear with the coupler in the second position, at least the first sun gear, the first carrier member, the first planetary gear, the first ring gear, and the intermediary gear are rotating as one unit. While the transmission is operating in the reverse gear during the regenerative braking, at least the first sun gear, the first carrier member, the first planetary gear, the first ring gear, and the intermediary gear are rotating as one unit. The components are the first sun gear and the first planetary gear. The components are the first sun gear and the first ring gear. The components are the first planetary gear and the first ring gear.

In a fifth aspect, an electric motor comprises: a stator; a rotor having a rotor shaft; and a transmission coupled to the rotor shaft, wherein when the rotor shaft rotates in a first direction an output shaft of the transmission rotates in a second direction opposite to the first direction with a first gear ratio, and wherein when the rotor shaft rotates in the second direction the output shaft of the transmission rotates in the second direction with a second gear ratio different from the first gear ratio.

Implementations can include any or all of the following features. The transmission further comprises: a first sun gear coupled to the rotor shaft; a first planetary gear having an axis fixed to a first ground in the transmission, the first planetary gear being gear coupled to the first sun gear; a first ring gear that is gear coupled to the first planetary gear, the ring gear having a first carrier member; a second sun gear; a second planetary gear being gear coupled to the second sun gear; a second ring gear that is gear coupled to the second planetary gear; and a second carrier member that carries the second ring gear. The transmission further comprises: first and second one-way clutches, the first one-way clutch coupled between the first carrier member and the second sun gear, the second one-way clutch coupled between the first sun gear and the second sun gear, the second one-way clutch having an opposite orientation to the first one-way clutch. The first one-way clutch engages with the output shaft, and wherein the second one-way clutch engages with the output shaft. The electric motor has first and second transmissions, and wherein when the rotor shaft rotates in a first direction respective output shafts of the first and second transmissions each rotate in the second direction opposite to the first direction with the first gear ratio, and wherein when the rotor shaft rotates in the second direction the respective output shafts of the first and second transmissions each rotate in the second direction with the second gear ratio different from the first gear ratio.

In a sixth aspect, a transmission comprises: first and second one-way clutches, the second one-way clutch having an opposite orientation to the first one-way clutch, wherein the transmission changes gear ratio, without changing rotation direction, based on a change in rotation direction of an input shaft to the transmission.

Implementations can include any or all of the following features. The transmission further comprises: a sun gear; a planetary gear that is gear coupled to the sun gear; and a cage that is gear coupled to the planetary gear. The first one-way clutch is coupled to an outer diameter of the input shaft and engages with the sun gear, and wherein the second one-way clutch is coupled to an inner diameter of the input shaft and engages with an output shaft. The first one-way clutch is coupled to an inner diameter of the sun gear. The planetary gear has a fixed carrier. The input shaft is coupled to a rotor shaft. The cage is coupled to the output shaft. The second one-way clutch engages with the output shaft. The second one-way clutch engages with the output shaft via the cage.

BRIEF DESCRIPTION OF DRAWINGS

Like reference symbols in the various drawings indicate like elements.

DETAILED DESCRIPTION

This document describes examples of systems and techniques for providing a rotation direction driven two-speed transmission. In some implementations, this can allow an electric motor to switch gears by changing the direction that the rotor is rotating. This can provide advantages such as cost reduction, a more compact size, increased efficiency, and/or reduced inertia load compared to previous transmission approaches. The present transmissions can feature rotor level decoupling to enable freewheeling of a vehicle. For example, one of multiple electric motors in the vehicle can be decoupled when the vehicle is cruising to improve mileage.

Examples herein refer to a vehicle. A vehicle is a machine that transports passengers or cargo, or both. A vehicle can have one or more electric motors. Examples of vehicles include, but are not limited to, cars, trucks, buses, motorcycles, and scooters. The number of wheels can differ between types of vehicles, and one or more (e.g., all) of the wheels can be used for propulsion of the vehicle. The vehicle can include a passenger compartment accommodating one or more persons. A vehicle can be powered exclusively by electricity, or can use one or more other energy source in addition to electricity, to name just a few examples.

Examples described herein refer to an electric motor. An electric motor as used herein can be any type of electric motor, including, but not limited to, a permanent-magnet motor, an induction motor, a synchronous motor, or a reluctance motor.

Figure 1A:
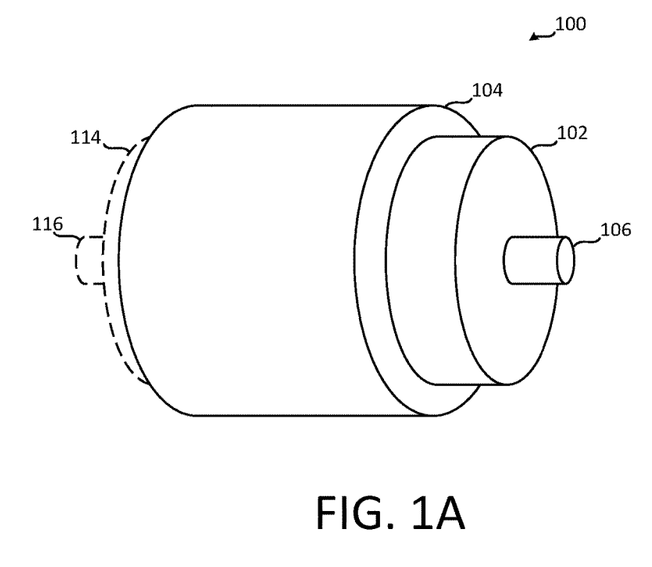
FIGS. 1A-1D show an example of an electric motor with a rotation direction driven two-speed transmission.
Figure 1B:
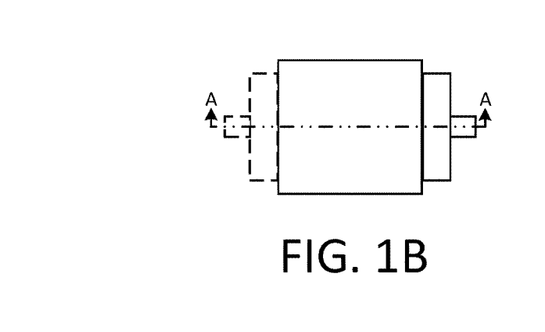
Figure 1C:
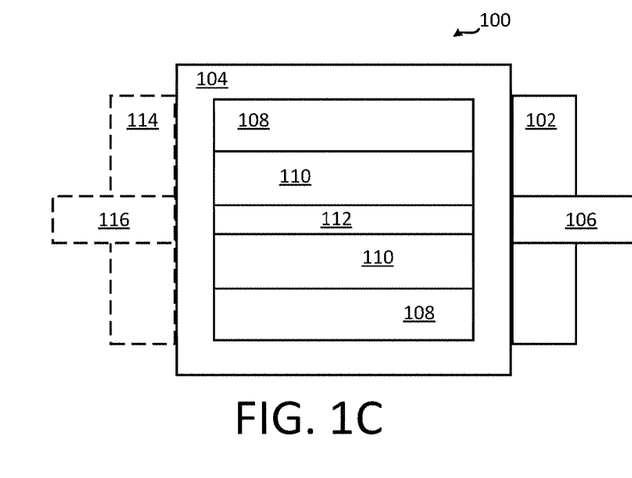
Figure 1D:
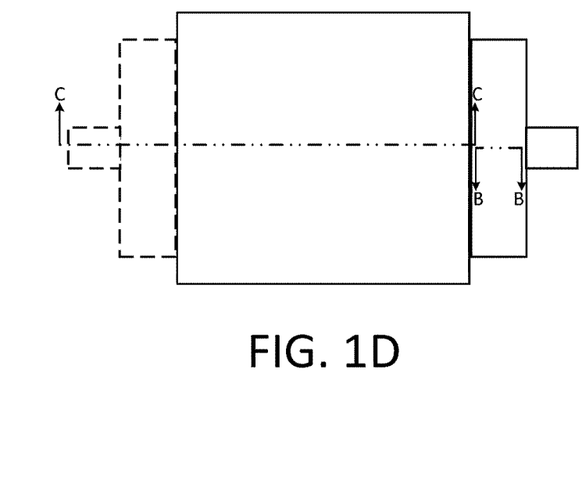

FIGS. 1A-1D show an example of an electric motor 100 with a rotation direction driven two-speed transmission 102. FIG. 1A shows a perspective view, and FIG. 1C a cross section taken along the line A-A in FIG. 1B, of the electric motor 100. Here, a transmission 102 is mounted at one end of a motor housing 104 and can change gear based on a rotation direction of the electric motor 100. The electric motor 100 and/or the transmission 102 can be used with one or more other examples described elsewhere herein. The electric motor 100 can have a single-side transmission, or can have an active-core style dual planetary transmission, to name just two examples.

The transmission 102 has an output shaft 106. For example, the output shaft 106 can be coupled to a wheel axle (e.g., welded to a drive shaft) or any other load to be driven by the electric motor 100. The electric motor 100 has a stator 108 and a rotor 110 within the motor housing 104. The rotor 110 is coupled to a rotor shaft 112 so as to be rotatable. When the rotor shaft 112 rotates in a first direction the output shaft 106 of the transmission 102 rotates in a second direction opposite to the first rotation with a first gear ratio. When the rotor shaft 112 rotates in the second direction the output shaft 106 of the transmission 102 rotates in the second direction with a second gear ratio different from the first gear ratio. As such, the electric motor 100 can switch gears by changing the direction that its rotor 110 and rotor shaft 112 are rotating. For example, the electric motor 100 changes its direction of rotation by changing the rotational direction of its magnetic field generated by the stator 108. The change in motor rotation (i.e., switching between gears of the transmission 102) can be done automatically by a motor control algorithm or can be triggered by way of the driver making an input into the vehicle.

In some implementations, the electric motor 100 has a transmission 114 mounted at the opposite end of the motor housing 104 from the transmission 102. The transmission 114 can have an output shaft 116 and like the transmission 102 can change gear based on a rotation direction of the electric motor 100. For example, when the rotor shaft 112 rotates in a first direction the output shafts 106 and 116 rotate in a second direction opposite to the first rotation with a first gear ratio. When the rotor shaft 112 rotates in the second direction the output shafts 106 and 116 rotate in the second direction with a second gear ratio different from the first gear ratio.

Figure 2A:
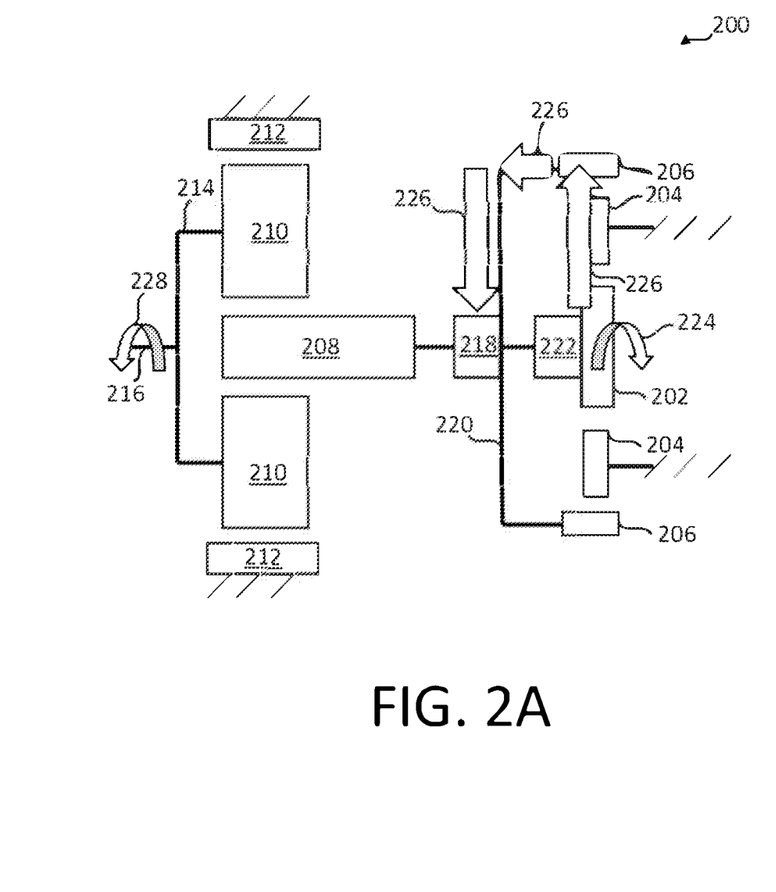
FIGS. 2A-2B schematically show examples of a rotation direction driven two-speed transmission.
Figure 2B:
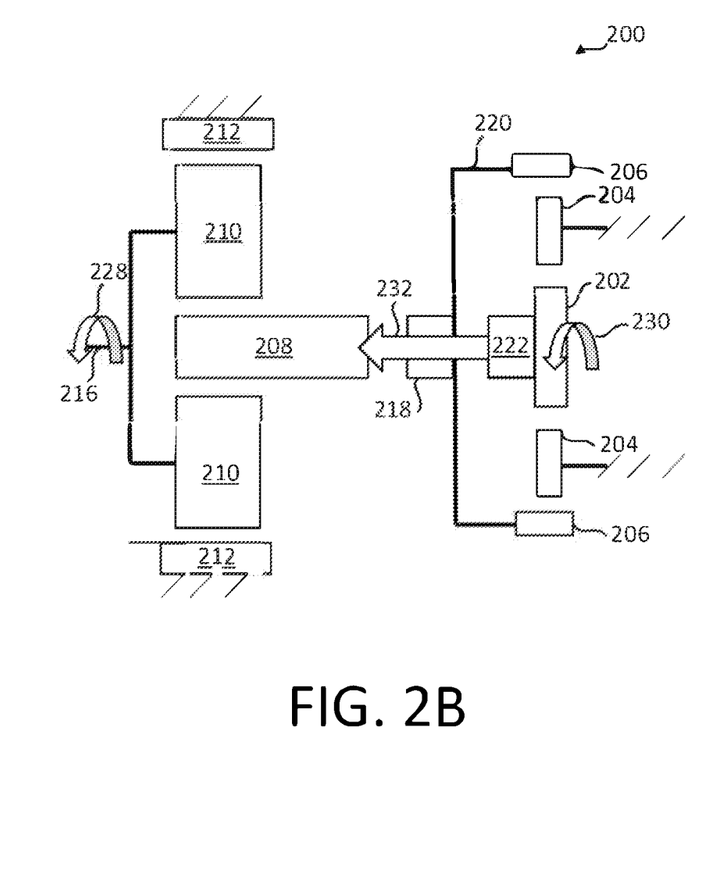

FIGS. 2A-2B schematically show examples of a rotation direction driven two-speed transmission. Here, a transmission 200 is schematically represented using rectangular shapes and can change gear based on a rotation direction of the electric motor (e.g., the electric motor 100 in FIGS. 1A-1D). While FIGS. 2A-2B are schematical illustrations and not pure sections, the perspectives presented in them approximately represent the view of a section taken along the line B-B in FIG. 1D, in an implementation where the transmission 102 includes the components of the transmission 200. The transmission 200 can be used with one or more other examples described elsewhere herein.

The transmission 200 includes a sun gear 202. In some implementations, the sun gear 202 can be coupled to a rotor shaft of an electric motor with which the transmission 200 is being used (e.g., the rotor shaft 112 in FIGS. 1A-1D). The transmission 200 includes one or more planetary gears 204 that are gear coupled to the sun gear 202. Each of the planetary gears 204 can rotate about a fixed axis (e.g., can have a stationary center), as schematically illustrated. The transmission 200 includes a ring gear 206 that is gear coupled to the planetary gears 204.

The transmission 200 includes a sun gear 208 to be driven by rotation of the sun gear 202. The transmission 200 includes one or more planetary gears 210 that are gear coupled to the sun gear 208. The transmission 200 includes a ring gear 212 that is gear coupled to the planetary gears 210. The ring gear 212 is at least temporarily fixed, as schematically illustrated (e.g., the ring gear 212 can be at least temporarily fixed to the same structure as the rotation axes of the planetary gears 204). A carrier member 214 is coupled to the planetary gears 210. The carrier member 214 can drive an output shaft 216 of the transmission 200. For example, the output shaft 216 can be coupled to a wheel axle or any other load to be driven by an electric motor having the transmission 200.

The transmission 200 includes a one-way clutch 218 coupled to a carrier member 220 that is in turn coupled to (e.g., carries) the ring gear 206. The transmission 200 includes a one-way clutch 222 that is coupled to the sun gear 202 and that engages with the sun gear 208. The one-way clutch 218 has an opposite orientation to that of the one-way clutch 222. Any of multiple types of one-way clutches can be used, including but not limited to, a sprag clutch.

FIG. 2A shows an example of a first mode of operation of the transmission 200. The sun gear 202 rotates in a direction 224. For example, the direction 224 is a clockwise direction when the sun gear 202 is viewed from the rotor shaft. The rotation of the sun gear 202 in the direction 224 causes the one-way clutch 218 to be engaged (i.e., to convey torque), and causes the one-way clutch 222 to be disengaged (i.e., to not convey torque). Arrows 226 schematically illustrate that in the first mode of operation the rotation of the sun gear 202 in the direction 224 causes torque to be conveyed by way of the planetary gears 204 and the ring gear 206 to the one-way clutch 218, which drives the sun gear 208. As a result, the output shaft 216 rotates in a direction 228 which is opposite to the direction 224. The rotation of the output shaft 216 in the first mode of operation has a first gear ratio relative to the rotation of the sun gear 202.

FIG. 2B shows an example of a second mode of operation of the transmission 200. The sun gear 202 rotates in a direction 230. The direction 230 is opposite to the direction 224 (FIG. 2A). For example, the direction 230 is a counterclockwise direction when the sun gear 202 is viewed from the rotor shaft. The rotation of the sun gear 202 in the direction 230 causes the one-way clutch 218 to be disengaged (i.e., to not convey torque), and causes the one-way clutch 222 to be engaged (i.e., to convey torque). An arrow 232 schematically illustrates that in the second mode of operation the rotation of the sun gear 202 in the direction 230 causes torque to be conveyed by way of the one-way clutch 222 driving the sun gear 208. As a result, the output shaft 216 rotates in the direction 228, and the direction 228 is the same as the direction 230. The rotation of the output shaft 216 in the second mode of operation has a second gear ratio relative to the rotation of the sun gear 202. The second gear ratio is different from the first gear ratio. That is, in the second mode of operation, where the sun gear 202 rotates in the opposite direction compared to the first mode of operation, the output shaft 216 rotates in the same direction as in the first mode of operation but with a different gear ratio.

Figure 3:
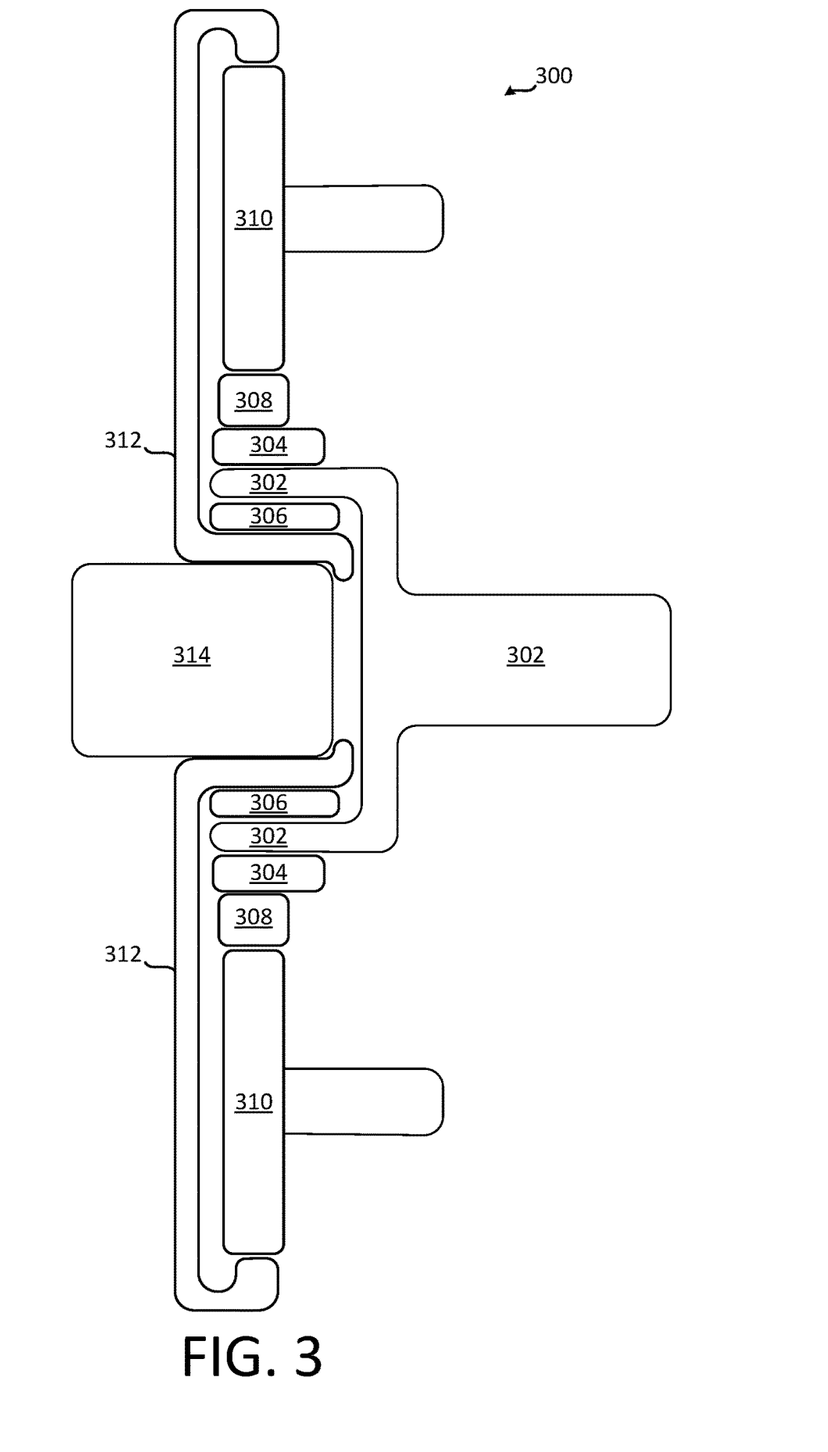
FIG. 3 schematically shows a cross section of an example of a rotation direction driven two-speed transmission.

FIG. 3 schematically shows a cross section of an example of a rotation direction driven two-speed transmission. A transmission 300 can here provide different gear ratios, with the same direction of output rotation, depending on the direction of input rotation. In short, the transmission 300 can illustrate an example where an input shaft is sprag-coupled to either an output shaft or to a sun gear for providing a rotation direction driven two-speed transmission. While FIG. 3 is a schematical illustration and not a pure section, the perspective presented in it approximately represents the view of a section taken along the line B-B in FIG. 1D, in an implementation where the transmission 102 includes the components of the transmission 300. The transmission 300 can be used with one or more other examples described elsewhere herein.

The transmission 300 has an input shaft 302. In some implementations, the input shaft 302 can be coupled to a rotor shaft of an electric motor with which the transmission 300 is being used (e.g., the rotor shaft 112 in FIGS. 1A-1D). The transmission 300 has a one-way clutch 304 (e.g., a sprag clutch) coupled to an outer diameter of the input shaft 302. The transmission 300 has a one-way clutch 306 (e.g., a sprag clutch) coupled to an inner diameter of the input shaft 302. The one-way clutch 306 has an opposite orientation to that of the one-way clutch 304.

The one-way clutch 304 engages with a sun gear 308. The sun gear 308 is gear coupled to a planetary gear 310 that has a fixed carrier. The planetary gear 310 is gear coupled to a cage 312 that is in turn coupled to an output shaft 314. Rotation of the input shaft 302 in a first direction causes the one-way clutch 304 to be engaged (i.e., to convey torque), and causes the one-way clutch 306 to be disengaged (i.e., to not convey torque). Torque is then conveyed by way of the one-way clutch 304, the sun gear 308, the planetary gear 310, the cage 312, and the output shaft 314. As a result, the output shaft 314 rotates in a direction which is opposite to the direction that the input shaft 302 is rotating. The rotation of the output shaft 314 has a first gear ratio relative to the rotation of the input shaft 302.

The one-way clutch 306 engages with the output shaft 314 (e.g., via the cage 312). Rotation of the input shaft 302 in a second direction opposite to the first direction causes the one-way clutch 304 to be disengaged (i.e., to not convey torque), and causes the one-way clutch 306 to be engaged (i.e., to convey torque). Torque is then conveyed by way of the one-way clutch 306 and the output shaft 314. As a result, the output shaft 314 rotates in a direction which is the same as the second direction in which the input shaft 302 is rotating. The rotation of the output shaft 314 has a second gear ratio relative to the rotation of the input shaft 302, the second ratio different from the first ratio. As such, the transmission 300 switches based on a change in the direction that the input shaft 302 is rotating.

Any of the transmissions exemplified herein can be used in any of multiple implementations, including, but not limited to, in a vehicle. A vehicle such as an electric motorcycle, scooter, etc., can have an electric motor coupled to a rotation direction driven two-speed transmission. For example, a motor bike can have one electric motor in implementations where driving in reverse, and regenerative braking, are not needed. A vehicle other than the above, including but not limited to, a car, bus, or truck, can have at least one electric motor with one or more transmissions according to the present subject matter of any of the examples above. In some implementations, such a vehicle can have at least two electric motors: at least one electric motor having one or more transmissions according to the present subject matter of any of the examples above, and at least another electric motor having a different transmission whose operation is not controlled by rotation direction. For example, the vehicle can then use the other electric motor and its transmission to perform functions such as regenerative braking and/or driving the vehicle in reverse. The electric motor(s) having the transmission(s) according to the present subject matter of any of the examples above can be installed anywhere in the vehicle, including but not limited to, as the rear drive unit(s).

Figure 4:
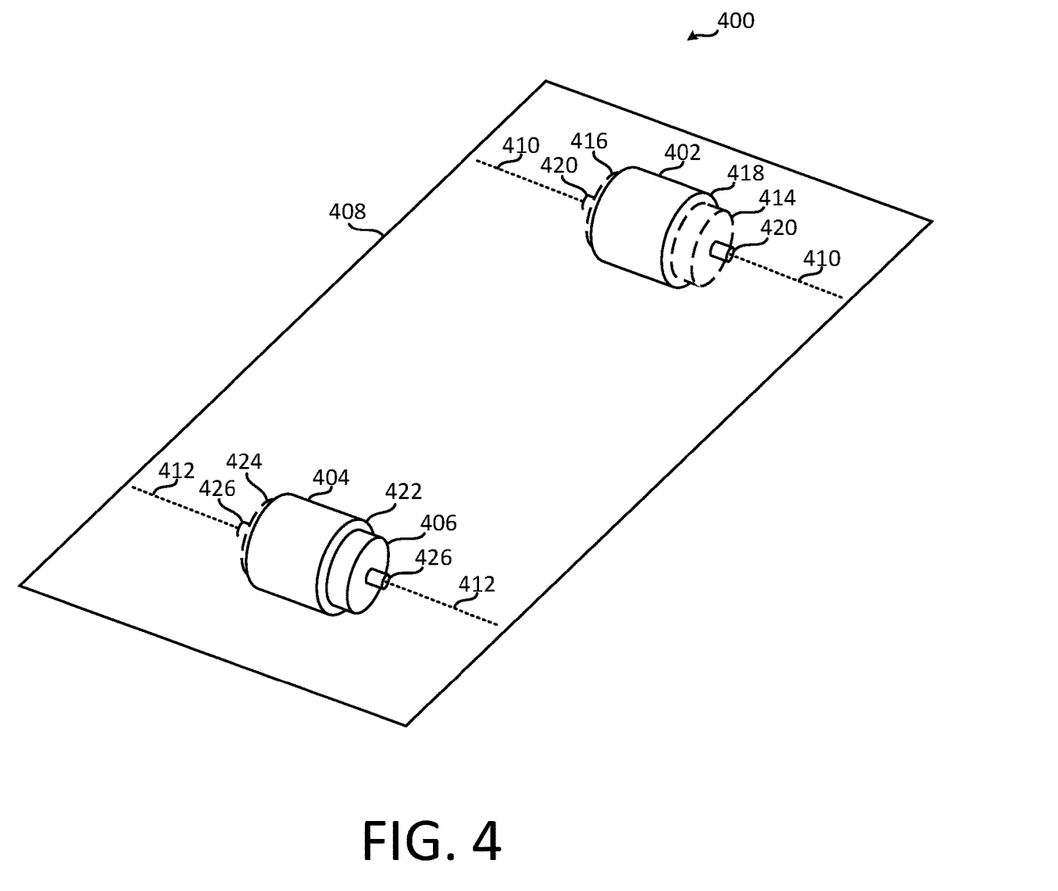
FIG. 4 schematically shows an example of a vehicle with at least an electric motor and an electric motor with a rotation direction driven two-speed transmission that provides passive reverse.
Figure 5:
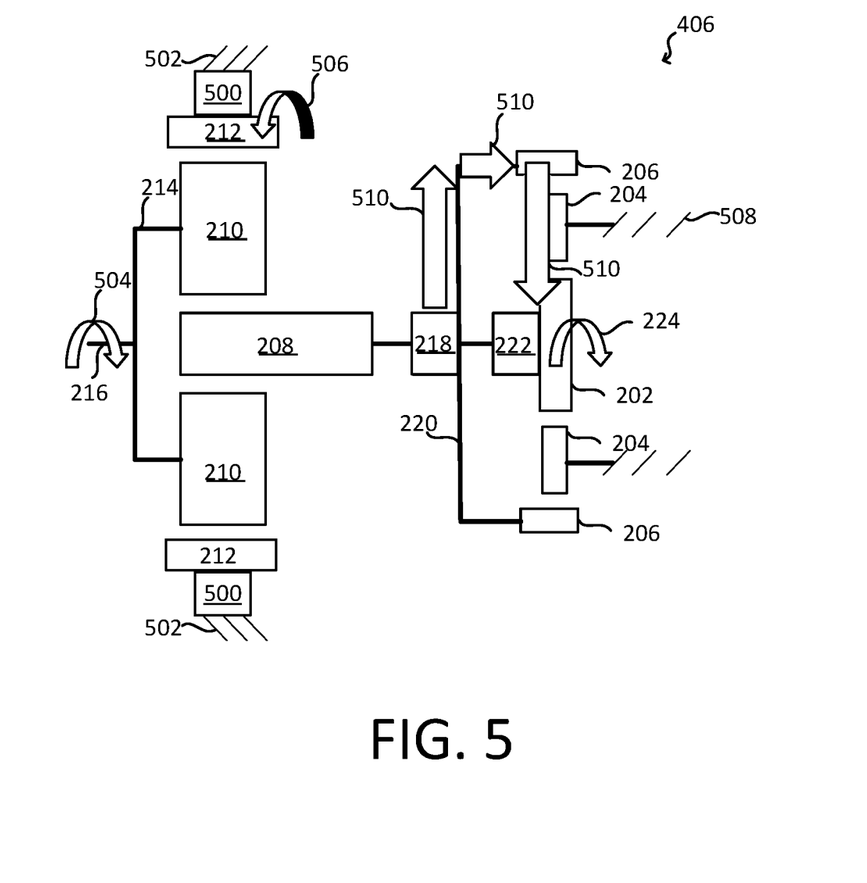
FIG. 5 schematically shows an example of the rotation direction driven two-speed transmission of FIG. 4.

Some examples of a vehicle with multiple electric motors will now be described. FIG. 4 schematically shows an example of a vehicle 400 with at least an electric motor 402 and an electric motor 404 with a rotation direction driven two-speed transmission 406 that provides passive reverse. FIG. 5 schematically shows an example of the rotation direction driven two-speed transmission 406 of FIG. 4. The vehicle 400 is schematically illustrated using a rectangle 408. For example, the rectangle 408 here represents the body, passenger cabin, chassis, wheels, energy storage (e.g., battery pack), electrical system, and thermal system of the vehicle 400. At least one aspect of the examples in FIG. 4 and/or FIG. 5 can be used with one or more other examples described elsewhere herein.

The electric motor 402 can be configured to work with an axle 410 of the vehicle 400. Similarly, the electric motor 404 can be configured to work with an axle 412 of the vehicle 400. Each of the axles 410 and 412 is here schematically illustrated as a dashed line and can be coupled to one or more respective road wheels (not shown) of the vehicle 400. In some implementations, the electric motor 402 can be referred to as a front motor, and the electric motor 404 as a rear motor, of the vehicle 400. In other implementations, the electric motor 404 can be referred to as a front motor, and the electric motor 402 as a rear motor, of the vehicle 400.

The electric motor 402 can be a single speed electric motor, or can have different gears provided by one or more transmissions 414 or 416 mounted at the end(s) of a housing 418. The electric motor 402 has an output shaft 420 aligned with the axle 410.

The electric motor 404 can have only the rotation direction driven two-speed transmission 406 mounted at one end of a housing 422, or can additionally have a rotation direction driven two-speed transmission 424 at an opposite end of the housing 422. The electric motor 404 has an output shaft 426 aligned with the axle 412.

To drive the vehicle 400 forward, either or both of the electric motors 402 or 404 can operate in a forward direction. To drive the vehicle 400 in reverse, the electric motor 402 can operate in a reverse direction opposite to the forward direction. The electric motor 404, which provides passive reverse, is then not energized while the electric motor 402 drives the vehicle 400 in reverse.

The vehicle 400 can have more than two electric motors. For example, two electric motors can power the axle 410, with one or more electric motors powering the axle 412. As another example, two electric motors can power the axle 412, with one or more electric motors powering the axle 410.

Referring now also to FIG. 5, the rotation direction driven two-speed transmission 406 includes some components identical or similar to those of the transmission 200 in FIG. 2A, and those components are not described in detail here. The ring gear 212 in the transmission 200 may have been fixed (e.g., by a spline) as mentioned above. By contrast, the rotation direction driven two-speed transmission 406 has a one-way clutch 500 (e.g., a sprag clutch) coupled between the ring gear 212 and a ground 502. The one-way clutch 500 has the same orientation as (i.e., a common orientation with) the one-way clutch 218. The axis of the planetary gear 204 is shown as fixed to a ground 508.

When the electric motor 402 is driving the vehicle 400 in reverse, the road wheel(s) on the axle 412 of the electric motor 404 will be rotating backward. This will cause the carrier member 214 of the rotation direction driven two-speed transmission 406 to rotate backward with a direction 504. This rotation causes the one-way clutches 218 and 222 to engage. To avoid breaking the weak link in the transmission, the ring gear 212 rotates forward in a direction 506. That is, in the transmission 200 in FIG. 2A, the one-way clutches 218 and 222 are both engaged when the electric motor runs in reverse and compete against each other, causing a mechanical locking of the mechanism. In the rotation direction driven two-speed transmission 406, on the other hand, this situation is completely addressed by the one-way clutch 500 between the ring gear 212 and a ground 502. Arrows 510 schematically illustrate that the carrier member 220, the ring gear 206, the planetary gear(s) 204, and the sun gear 202 are driven in a power transfer from left to right in the present illustration. The rotor shaft of the electric motor 404 is rotated backwards in the direction 224 during passive reverse. That is, using the rotation direction driven two-speed transmission 406, the electric motor 404 can provide two-speed operation while the vehicle is driven forward, and can provide passive reverse (without being energized) while the vehicle is driven in reverse.

FIGS. 6A-6D show examples of a two-speed electric gearbox with regenerative braking and reverse capabilities, where two-speed functionality is direction driven. Any or all aspects of the examples in FIGS. 6A-6D can be used with one or more other examples described elsewhere herein.

A gearbox 600 includes some components identical or similar to those of the transmission 200 in FIG. 2A, and those components are not described in detail here. The transmission 200 has the axes of the planetary gears 204 coupled to ground; the gearbox 600, on the other hand, has a carrier member 602 coupled to the axes of the planetary gears 204. The gearbox 600 has an intermediary gear 604 that is co-axial with the rotor shaft (not shown). A one-way clutch 606 (e.g., a sprag clutch) is coupled between the intermediary gear 604 and a ground 608. The gearbox 600 has a coupler 610 that is movable along the direction of the rotor shaft axis. A solenoid 612 is fixed (coupled to ground, not shown) within the gearbox 600 and can actuate the coupler 610 to move in either or both directions. In the situation shown in FIG. 6A, the coupler 610 has been moved toward the right in the illustration and currently connects the carrier member 602 and the intermediary gear 604 to each other.

Figure 6A:
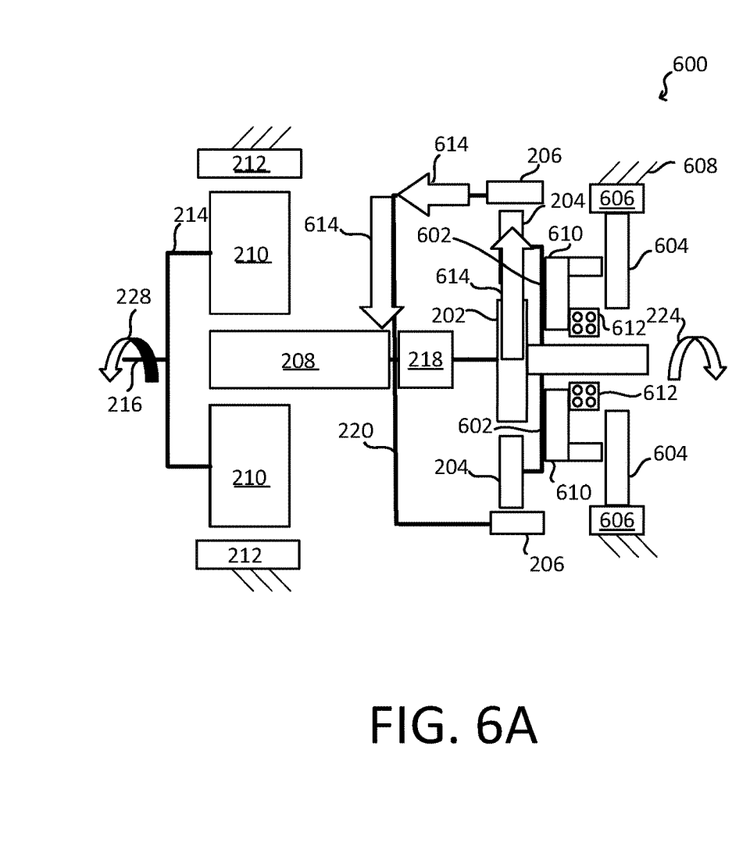
FIGS. 6A-6D show examples of a two-speed electric gearbox with regenerative braking and reverse capabilities, where two-speed functionality is direction driven.
Figure 6B:
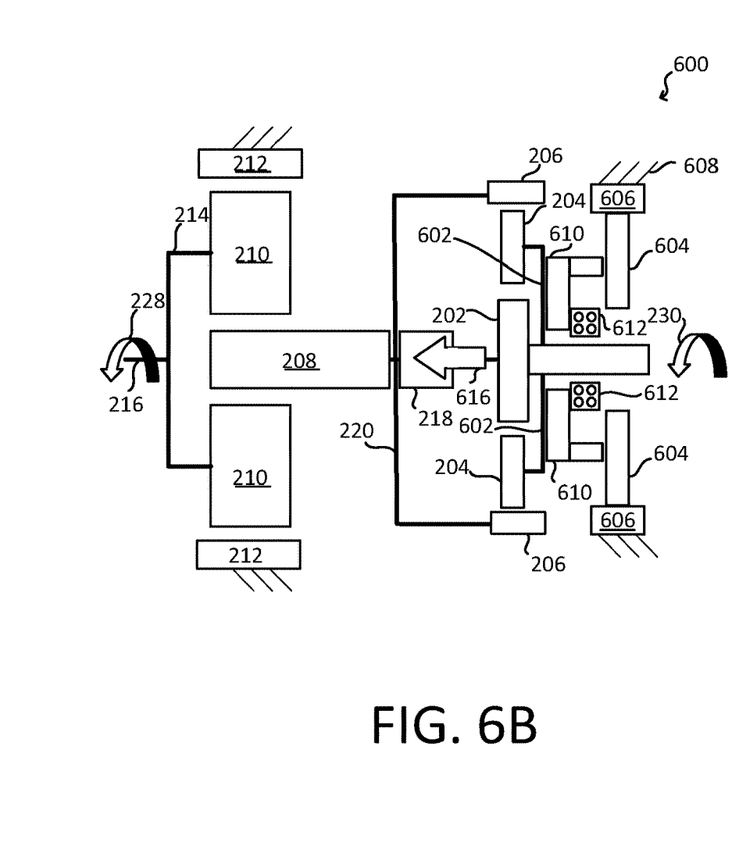
Figure 6C:
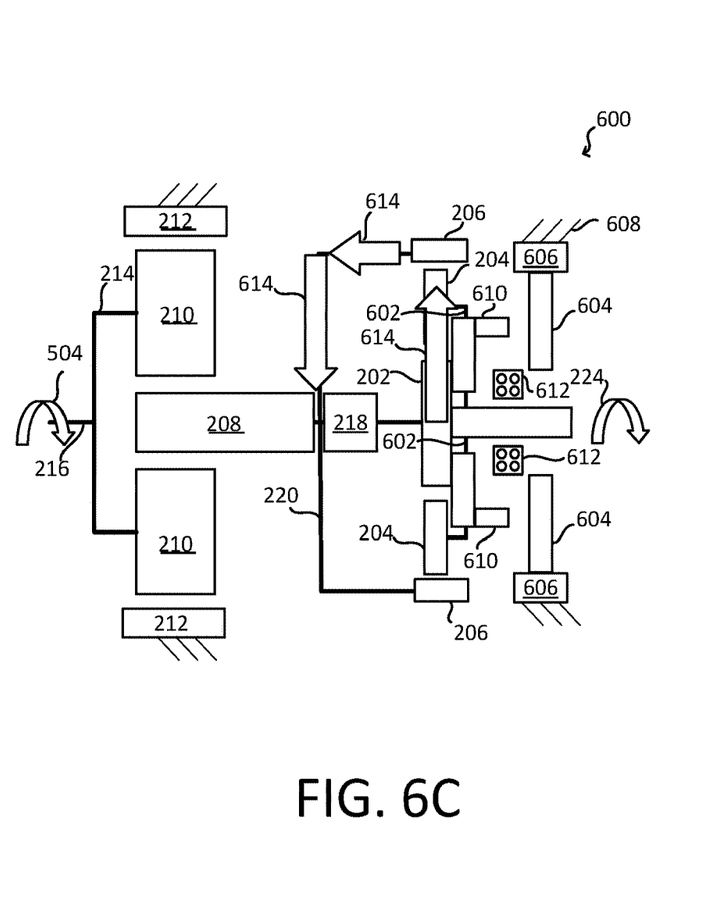
Figure 6D:
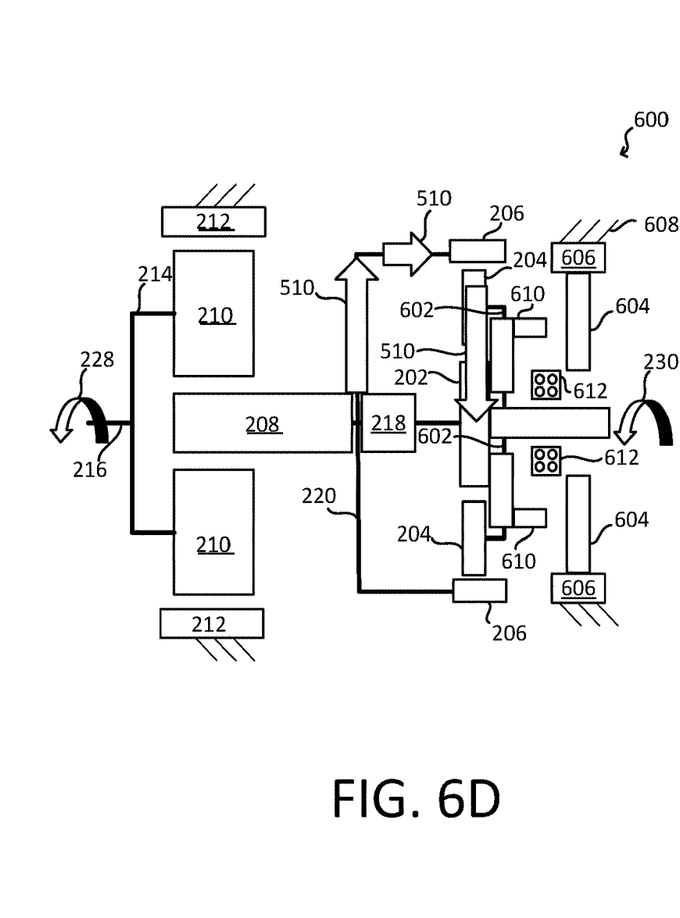

The gearbox 600 can operate in first gear (e.g., as illustrated in FIG. 6A), in second gear (e.g., as illustrated in FIG. 6B), in reverse (e.g., as illustrated in FIG. 6C), or in regenerative braking mode (e.g., as illustrated in FIG. 6D). Beginning with FIG. 6A, the coupler 610 currently connects the carrier member 602 and the intermediary gear 604 to each other, and the selection of first gear is then driven by the rotation direction of the rotor shaft. That is, the present position of the coupler 610 corresponds to the gearbox 600 operating in first or second gear. The rotor shaft here rotates backward as indicated by the direction 224. Arrows 614 schematically illustrate that power is here transferred from right to left through the sun gear 202, the planetary gears 204, the ring gear 206, and the carrier member 220 to drive the sun gear 208, whereby the carrier member 214 rotates in the direction 228 (i.e., forward). The first gear can have a relatively high gear ratio appropriate for the type of vehicle. For example, the speed of the road wheel(s) driven by the output shaft 216 can be a relatively low forward speed. The one-way clutch 606 is engaged in first gear so that the intermediary gear 604, the coupler 610, and the carrier member 602 do not currently rotate. The one-way clutch 606 currently prevents rotation of at least the intermediary gear 604.

To shift from first to second gear as shown in FIG. 6B, the rotor axis can instead be rotated forward (e.g., in the direction 230). As when driving in the first gear (FIG. 6A), the coupler 610 currently connects the carrier member 602 and the intermediary gear 604 to each other. In some implementations, this position of the coupler 610 can be a default state for the solenoid 612. For example, when the solenoid 612 is not active (not energized), the absence of a generated magnetic field can cause the coupler 610 to assume the position shown in FIGS. 6A-6B (e.g., by way of being acted on by a bias member such as a spring). Due to the direction of rotation, the one-way clutch 606 is currently disengaged. As such, the intermediary gear 604 and the coupler 610 that are connected to each other will rotate as one unit in second gear. An arrow 616 schematically illustrates that power is here transferred from right to left through the sun gear 202 and the one-way clutch 218 to drive the sun gear 208, whereby the carrier member 214 rotates in the direction 228 (i.e., forward). The second gear can have a relatively low gear ratio appropriate for the type of vehicle. For example, the speed of the road wheel(s) driven by the output shaft 216 can be a relatively high forward speed.

To drive the vehicle in reverse, as shown in FIG. 6C, the solenoid 612 can be actuated to cause the coupler 610 to move toward the left in the present illustration. This position of the coupler 610 facilitates operation in reverse gear. In some implementations, this is a non-default state for the solenoid 612 (e.g., energization of the solenoid 612 causes the coupler 610 to move against a bias to assume the shown position). The coupler 610 thereby connects the carrier member 602 and the sun gear 202 with each other. The arrows 614 schematically illustrate that power is here transferred from right to left through the sun gear 202, the planetary gears 204, the ring gear 206, and the carrier member 220 to drive the sun gear 208, whereby the carrier member 214 rotates in the direction 504 (i.e., in reverse). The one-way clutches 218 and 606 are disengaged when driving in reverse. As such, the first stage of the gearbox 600 will rotate as one unit when driving in reverse.

To obtain regenerative braking, as shown in FIG. 6D, the solenoid 612 can be actuated to cause the coupler 610 to move toward the left in the present illustration. This position of the coupler 610 facilitates regenerative braking. The rotor axis can be rotated forward (e.g., in the direction 230). For example, while the vehicle is driving in second gear (e.g., as in FIG. 6B) the coupler 610 can be moved to connect the carrier member 602 and the sun gear 202 with each other. The arrows 510 schematically illustrate that while the carrier member 214 rotates in the direction 228 (i.e., forward), power is here transferred from left to right through the carrier member 220, the ring gear 206, the planetary gears 204, and the sun gear 202. The one-way clutches 218 and 606 are disengaged during regenerative braking. As such, the first stage of the gearbox 600 will rotate as one unit during regenerative braking.

In some examples above, the coupler 610 in its position toward the left connects the sun gear 202 and the carrier member 602 (i.e., the planetary gear 204) with each other. Other approaches can be used. In some implementations, the coupler 610 can be used for connecting any two of the following with each other: (a) the sun gear 202, (b) the planetary gear 204, or (c) the ring gear 206. As such, a two-speed electric gearbox with regenerative braking and reverse capabilities, where two-speed functionality is direction driven, can be provided where the coupler 610 provides any of the connections (a)-(b), (a)-(c), or (b)-(c).

Some examples described above involve arrangements where a transmission is positioned in line with a rotor axle of the electric motor. For example, in FIGS. 1A-1D the rotation direction driven two-speed transmission 102 is positioned in line with the rotor shaft 112. However, any of multiple other positions for a transmission can be used, for example as described in the following.

Figure 7:
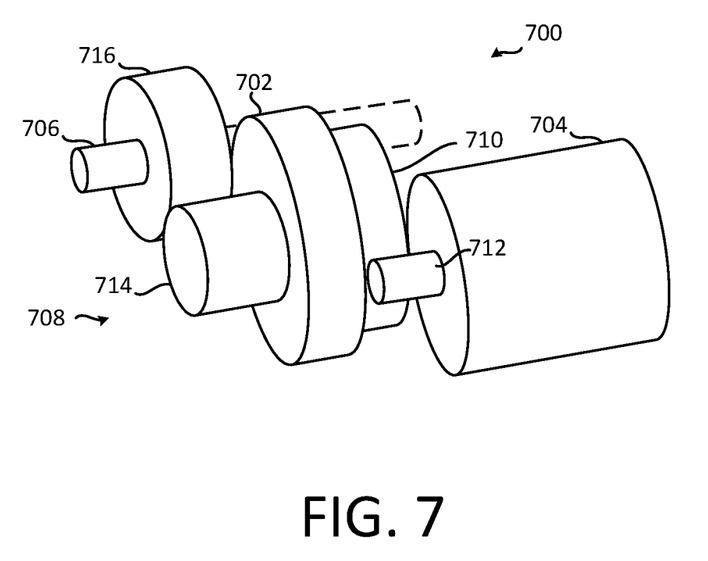
FIG. 7 schematically shows an example of a power train in which a transmission is positioned between an electric motor and a wheel axle.

FIG. 7 schematically shows an example of a power train 700 in which a transmission 702 is positioned between an electric motor 704 and a wheel axle 706. The power train 700 is schematically illustrated and some features are omitted for simplicity. One or more shapes of gears can be used, including, but not limited to, a conical frustum or a cylinder. One or more types of gear teeth can be used, including, but not limited to, helical gears or straight-cut gears. The power train 700 or any component thereof can be used with one or more other examples described elsewhere herein. For example, the transmission 702 can include any of the transmissions described elsewhere herein.

Here, a rotation axis of the transmission 702 is not in line with (but rather parallel to) a rotation axis of the electric motor 704. Similarly, the rotation axis of the transmission 702 is not in line with (but rather parallel to) a rotation axis of the wheel axle 706. Particularly, the power train 700 has an idle gear assembly 708 positioned between the electric motor 704 and the wheel axle 706. The idle gear assembly 708 includes a gear 710 that is gear coupled to a gear of a rotor shaft 712 of the electric motor 704. The idle gear assembly 708 also includes a gear 714 that is gear coupled to a gear 716 of the wheel axle 706. The wheel axle 706 can extend in either or both directions from the gear 716 and can drive one or more wheels of a vehicle. The respective rotation axes of the gears 710 and 714 are coaxial with the rotation axis of the transmission 702. The transmission 702 can provide passive reverse and/or rotation direction driven gear selection.

Figure 8A:
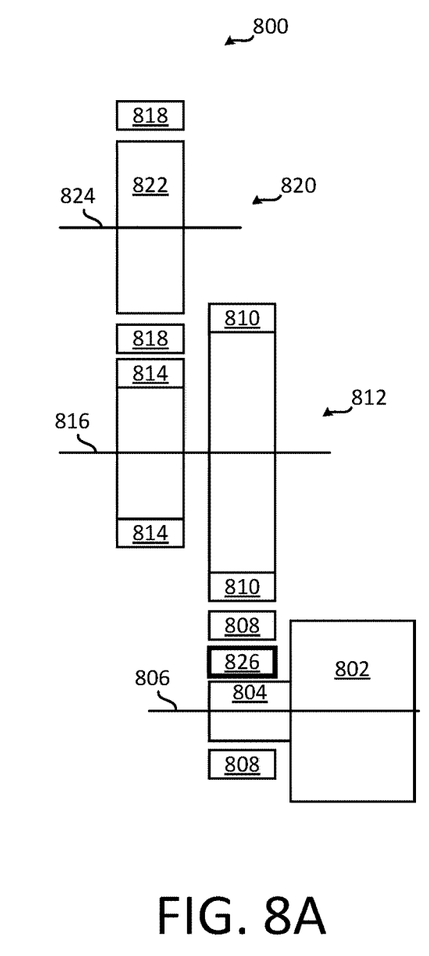
FIGS. 8A-8C schematically show examples of positions for a transmission within a power train.
Figure 8B:
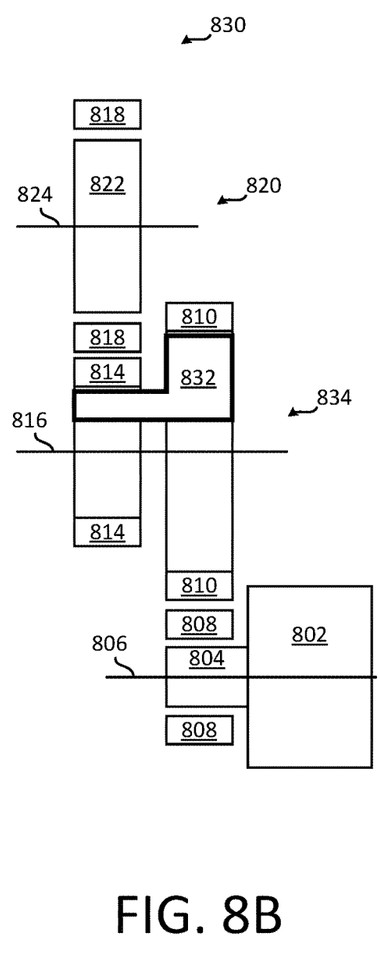
Figure 8C:
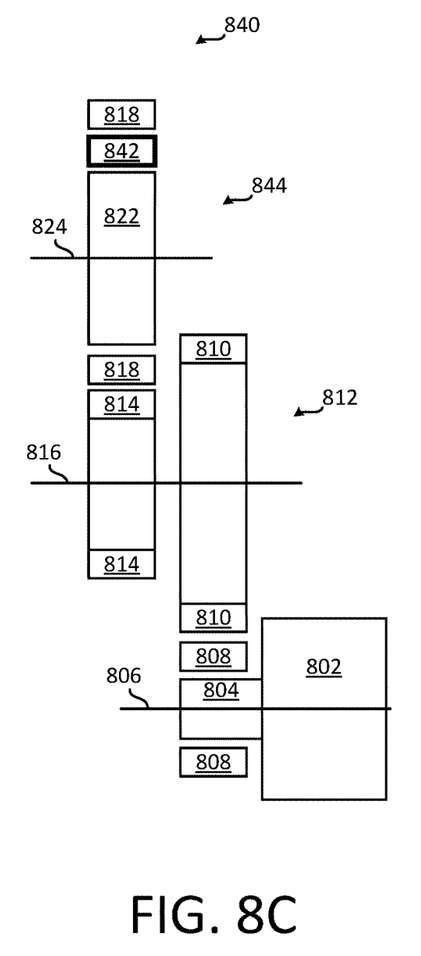

FIGS. 8A-8C schematically show examples of positions for a transmission within a power train. The power trains are illustrated schematically and are not pure sections; however, each of the presented perspectives approximately represents the view of a section taken along the line C-C in FIG. 1D, in an implementation where the electric motor 100 has a transmission positioned according to the respective example. Any of the illustrated positions can be used with one or more other examples described elsewhere herein. For example, any of the transmissions described herein can be used as the transmission mentioned in any of the following examples.

FIG. 8A shows a power train 800 that includes an electric motor 802 with a rotor shaft 804 defining an axis 806. The power train 800 includes a gear 808 to be driven directly or indirectly by the rotor shaft 804. The gear 808 is gear coupled to a gear 810 that is part of an idle gear assembly 812. The idle gear assembly 812 also includes a gear 814 such that the idle gear assembly 812 has an axis 816. The gear 814 is gear coupled to a gear 818 of a wheel axle assembly 820. The wheel axle assembly 820 also includes a wheel axle 822 that is to be driven directly or indirectly by the gear 818 according to an axis 824. The axes 806, 816 and 824 are here parallel to each other.

In the power train 800, a transmission 826 is positioned at the rotor shaft 804. In some implementations, the transmission 826 can be coaxial with the rotor shaft 804. For example, the transmission 200 (FIGS. 2A-2B) and/or the transmission 300 (FIG. 3) can be used as the transmission 826. The transmission 826 can provide a connection between the rotor shaft 804 (e.g., having a relatively smaller outer diameter) and the gear 808 (e.g., having a relatively greater inner diameter) in an analogous way to how the transmission 200 (FIGS. 2A-2B) provides a connection between the sun gear 202 (e.g., having a relatively smaller outer diameter) and the carrier member 214 (e.g., having a relatively greater inner diameter).

FIG. 8B shows a power train 830 that has a transmission 832 included in an idle gear assembly 834. The idle gear assembly 834 also includes the gears 810 and 814, and the transmission 832 is positioned between the gears 810 and 814. To summarize, the power train 830 includes the electric motor 802, the rotor shaft 804, the axis 806, the gear 808, the idle gear assembly 834 with the gears 810 and 814 and axis 816, and the wheel axle assembly 820 with the gear 818 and the wheel axle 822 and the axis 824. That is, in the power train 830 the transmission 832 is not positioned at the rotor shaft 804 but in the idle gear assembly 834. For example, the transmission 702 (FIG. 7) can be used as the transmission 832. The transmission 832 can provide a connection between the gear 810 (e.g., having a relatively greater inner diameter) and the gear 814 (e.g., having a relatively smaller inner diameter) in an analogous way to how the transmission 200 (FIGS. 2A-2B) provides a connection between the ring gear 206 (e.g., having a relatively greater inner diameter) and the carrier member 214 (e.g., having a relatively smaller inner diameter).

FIG. 8C shows a power train 840 that has a transmission 842 included in a wheel axle assembly 844. The wheel axle assembly 844 also includes the gear 818 and the wheel axle 822 and the axis 824, and the transmission 842 is positioned between the gear 818 and the wheel axle 822. To summarize, the power train 840 includes the electric motor 802, the rotor shaft 804, the axis 806, the gear 808, the idle gear assembly 812 with the gears 810 and 814 and axis 816, and the wheel axle assembly 844 with the gear 818 and the transmission 842 and the wheel axle 822 and the axis 824. That is, in the power train 840 the transmission 842 is not positioned at the idle gear assembly 812 or at the rotor shaft 804 but in the wheel axle assembly 844. The transmission 842 can provide a connection between the gear 818 (e.g., having a relatively greater inner diameter) and the wheel axle 822 (e.g., having a relatively smaller outer diameter) in an analogous way to how the transmission 200 (FIGS. 2A-2B) provides a connection between the ring gear 206 (e.g., having a relatively greater inner diameter) and the carrier member 214 (e.g., having a relatively smaller outer diameter).

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A transmission comprising:
   a first sun gear;
   a first planetary gear having an axis fixed to a first ground in the transmission, the first planetary gear being gear coupled to the first sun gear;
   a first ring gear that is gear coupled to the first planetary gear;
   a first carrier member that carries the first ring gear;
   a second sun gear;
   a first one-way clutch coupled between the first carrier member and the second sun gear;
   a second one-way clutch coupled between the first sun gear and the second sun gear, the second one-way clutch having an opposite orientation than the first one-way clutch;
   a second planetary gear being gear coupled to the second sun gear;
   a second ring gear that is gear coupled to the second planetary gear;
   a third one-way clutch coupled between the second ring gear and a second ground in the transmission, the third one-way clutch having a common orientation with the first one-way clutch; and
   a second carrier member that carries the second planetary gear.

2. The transmission of claim 1, further comprising an output shaft on the second carrier member.

3. The transmission of claim 1, wherein the first sun gear is aligned with the first planetary gear.

4. The transmission of claim 1, wherein the second sun gear is aligned with the first planetary gear.

5. The transmission of claim 1, wherein the first and second carrier members are aligned with each other.

6. An electric motor comprising:
   a stator;
   a rotor having a rotor shaft; and
   a transmission comprising:
      a first sun gear;
      a first planetary gear having an axis fixed to a first ground in the electric motor, the first planetary gear being gear coupled to the first sun gear;
      a first ring gear that is gear coupled to the first planetary gear;
      a first carrier member that carries the first ring gear;
      a second sun gear;
      a first one-way clutch coupled between the first carrier member and the second sun gear;
      a second one-way clutch coupled between the first sun gear and the second sun gear, the second one-way clutch having an opposite orientation than the first one-way clutch;
      a second planetary gear being gear coupled to the second sun gear;
      a second ring gear that is gear coupled to the second planetary gear;
      a third one-way clutch coupled between the second ring gear and a second ground in the electric motor, the third one-way clutch having a common orientation with the first one-way clutch; and
      a second carrier member that carries the second planetary gear.

7. The electric motor of claim 6, further comprising an output shaft on the second carrier member.

8. The electric motor of claim 6, wherein the first sun gear is aligned with the rotor shaft.

9. The electric motor of claim 6, wherein the second sun gear is aligned with the rotor shaft.

10. The electric motor of claim 6, wherein the first and second carrier members are aligned with each other.

11. A transmission comprising:
    a first sun gear;
    a first carrier member;
    a first planetary gear having an axis fixed to the first carrier member;
    a first ring gear that is gear coupled to the first planetary gear;
    a second carrier member that carries the first ring gear;
    a second sun gear coupled to the second carrier member;
    a first one-way clutch coupled between the first sun gear and the second sun gear;
    an intermediary gear that is co-axial with the first sun gear;
    a coupler movable between at least i) a first position where the coupler connects the first carrier member and the intermediary gear to each other, and ii) a second position where the coupler instead connects two components of the transmission to each other to facilitate operation in reverse gear and regenerative braking; and
    a second one-way clutch coupled between the intermediary gear and a ground in the transmission.

12. The transmission of claim 11, further comprising a solenoid configured to actuate the coupler into the first or second position.

13. The transmission of claim 12, wherein the first position corresponds to the transmission operating in any of a first gear or a second gear.

14. The transmission of claim 13, wherein in the first gear the second one-way clutch is engaged and prevents rotation of the intermediary gear.

15. The transmission of claim 13, wherein in the second gear the second one-way clutch is not engaged.

16. The transmission of claim 11, wherein while the transmission is operating in the reverse gear with the coupler in the second position, at least the first sun gear, the first carrier member, the first planetary gear, the first ring gear, and the intermediary gear are rotating as one unit.

17. The transmission of claim 11, wherein while the transmission is operating in the reverse gear during the regenerative braking, at least the first sun gear, the first carrier member, the first planetary gear, the first ring gear, and the intermediary gear are rotating as one unit.

18. The transmission of claim 11, wherein the components are the first sun gear and the first planetary gear.

* * * * *